United States Patent
Eguchi

(10) Patent No.: US 8,806,714 B2
(45) Date of Patent: Aug. 19, 2014

(54) CASTER SYSTEM EQUIPPED WITH HAND-OPERATED BRAKES

(75) Inventor: Tamaki Eguchi, Tokyo (JP)

(73) Assignee: Kabushiki Kaisha Hinomoto Jomae, Tokyo (JP)

( * ) Notice: Subject to any disclaimer, the term of this patent is extended or adjusted under 35 U.S.C. 154(b) by 0 days.

(21) Appl. No.: 13/578,586

(22) PCT Filed: Feb. 25, 2011

(86) PCT No.: PCT/JP2011/054336
§ 371 (c)(1),
(2), (4) Date: Aug. 10, 2012

(87) PCT Pub. No.: WO2011/105563
PCT Pub. Date: Jan. 9, 2011

(65) Prior Publication Data
US 2012/0311821 A1     Dec. 13, 2012

(30) Foreign Application Priority Data

Feb. 25, 2010 (JP) ................................. 2010-039622
Apr. 19, 2010 (JP) ................................. 2010-095593

(51) Int. Cl.
*B60B 33/00* (2006.01)
*B60B 33/02* (2006.01)
*A45C 5/14* (2006.01)

(52) U.S. Cl.
CPC ........... *A45C 5/145* (2013.01); *B60B 2900/111* (2013.01); *B62B 2301/0467* (2013.01); *B60B 33/0039* (2013.01); *B60B 33/021* (2013.01); *B60B 33/0028* (2013.01); *B60B 2900/112* (2013.01); *B60B 33/0086* (2013.01); *B60B 33/0092* (2013.01); *B60B 33/0023* (2013.01); *B60B 33/0057* (2013.01); *B60B 2900/115* (2013.01); *B60B 33/0081* (2013.01); *B60B 33/0049* (2013.01); *B60B 33/0068* (2013.01); *B60B 33/0073* (2013.01)
USPC ........................................................ 16/35 R

(58) Field of Classification Search
USPC .............. 16/18 R–18 B; 188/1.12, 17, 19, 31
See application file for complete search history.

(56) References Cited

U.S. PATENT DOCUMENTS

| 3,409,105 | A  | * | 11/1968 | Clinton ........................... | 188/29   |
| 6,212,969 | B1 | * | 4/2001  | Kuo ............................. | 74/500.5 |
| 6,286,183 | B1 | * | 9/2001  | Stickel et al. ................. | 16/35 R  |
| 6,296,261 | B1 | * | 10/2001 | deGoma .................... | 280/47.34 |
| 6,463,825 | B2 | * | 10/2002 | Lee ............................. | 74/501.6 |
| 2012/0160617 | A1 | * | 6/2012 | Qi et al. ...................... | 188/1.12 |

* cited by examiner

Primary Examiner — Victor Batson
Assistant Examiner — Matthew Sullivan
(74) Attorney, Agent, or Firm — patenttm.us

(57) ABSTRACT

Hand-operated brakes caster system is easy to use, compact, lightweight, low-cost. A fork supports a rotating wheel via an axle. A bag mounted base supports the swinging fork. A hollow swing shaft mounts on a base bearing. A force transmitting wire is pulled by a rotation knob in a controller away from the wheel. Opening direction force is applied by a spring to the wire in the opening direction. Therefore, if the knob is rotated by an angle not smaller than a predetermined value, reverse rotational moment is applied, locking the rotation knob. Force transmitted to a lever via the wire is magnified by the action of the lever, and the resulting force pushes a brake pin located inside the fork swing shaft. The brake pin abuts the tire resulting in frictional resistance preventing rotation of the wheel.

6 Claims, 10 Drawing Sheets

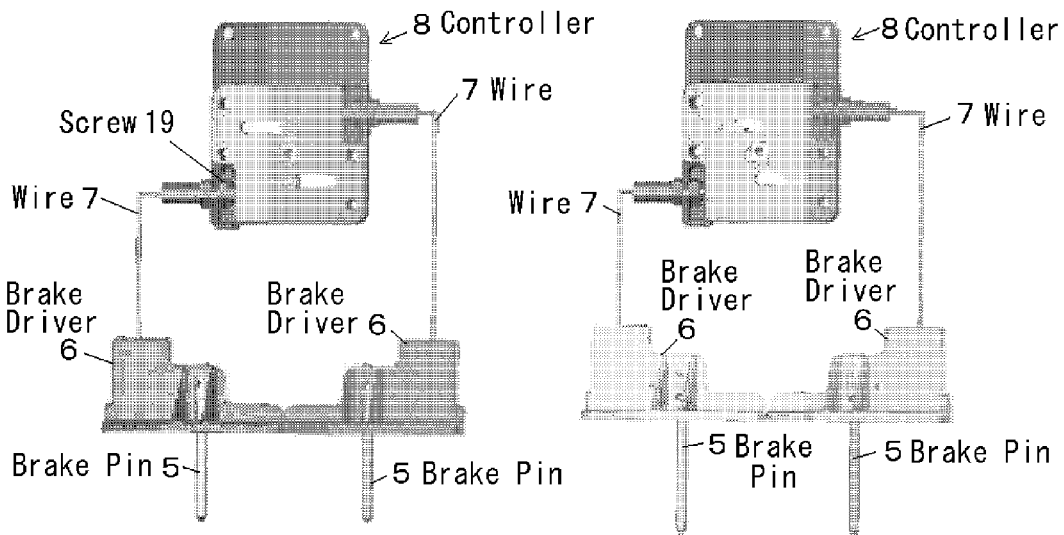
FIG. 2(a) Free-State  FIG. 2(b) Locked-State
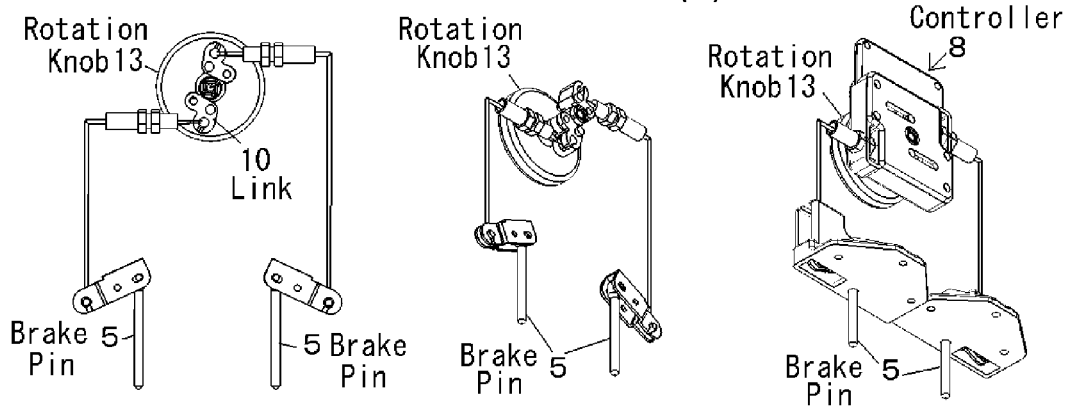
FIG. 2(c) Free-State  FIG. 2(d) Free-State  FIG. 2(e) Free-State
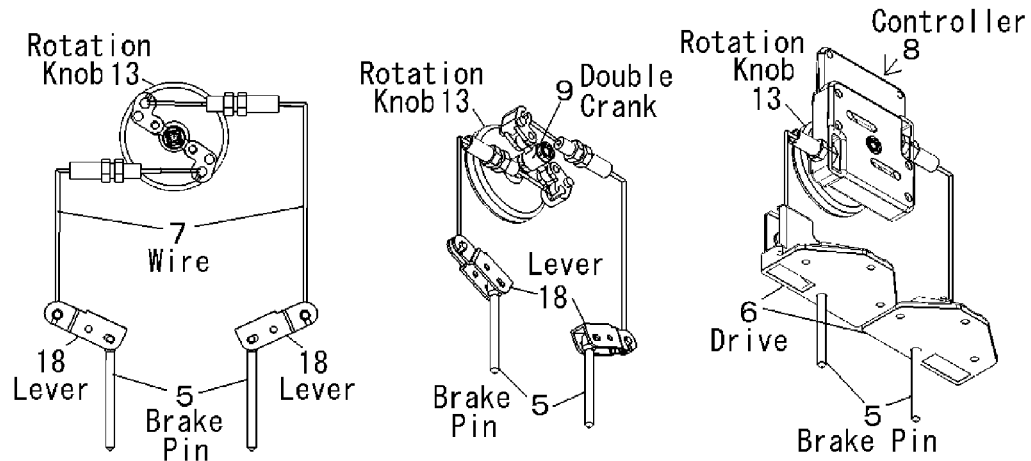
FIG. 2(f) Locked-State  FIG. 2(g) Locked-State  FIG. 2(h) Locked-State

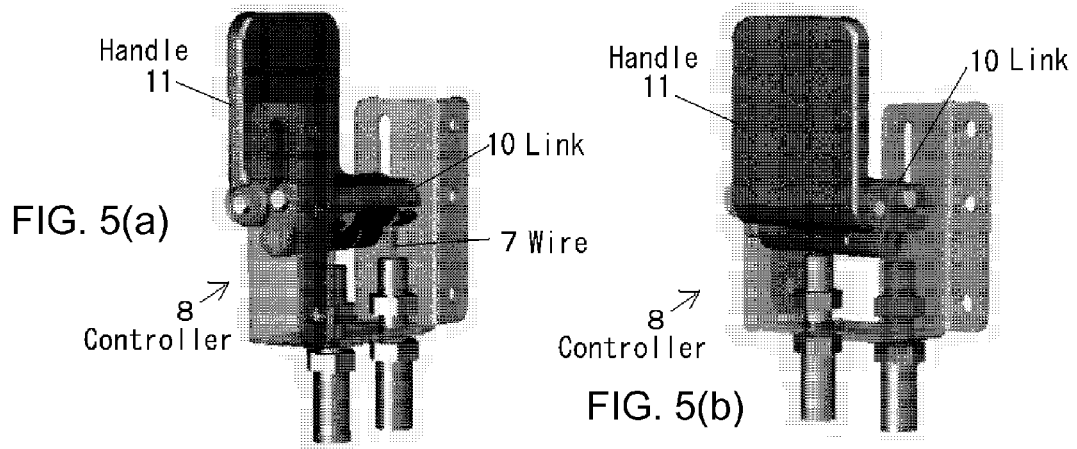
FIG. 5(a)
FIG. 5(b)
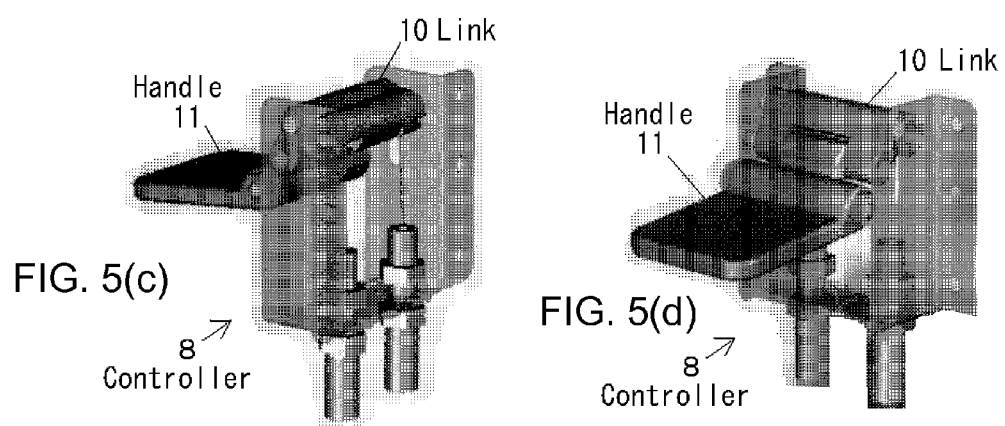
FIG. 5(c)
FIG. 5(d)
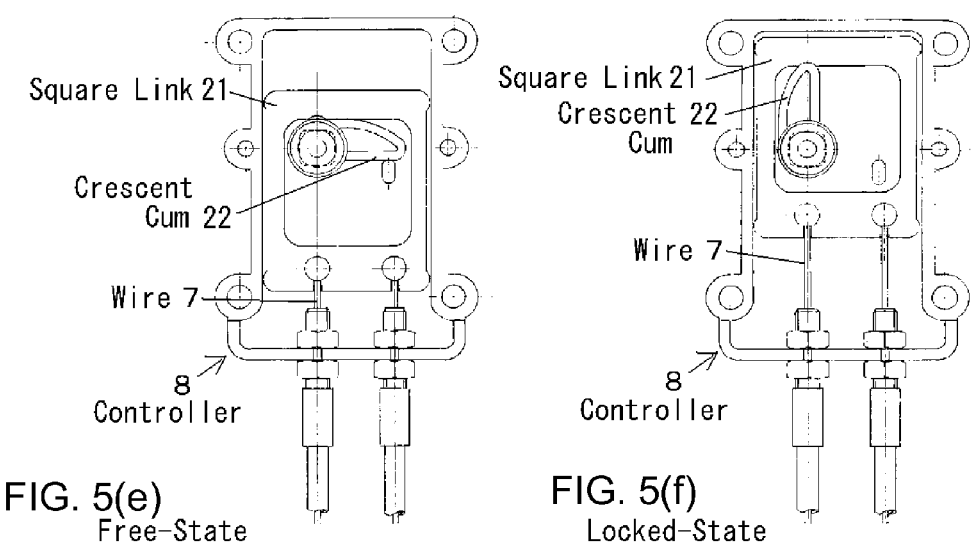
FIG. 5(e)
Free-State
FIG. 5(f)
Locked-State

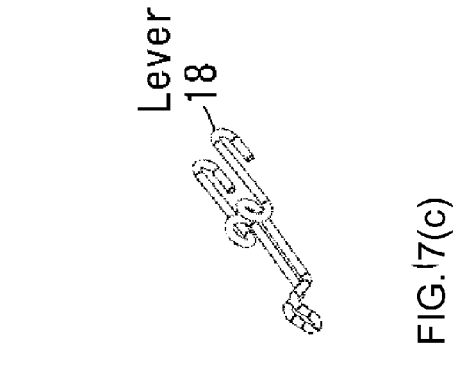
FIG. 7(a)
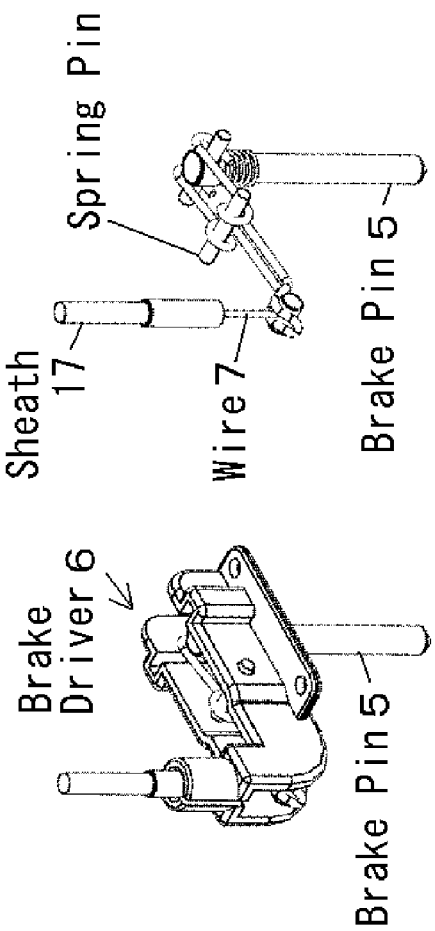
FIG. 7(b)
FIG. 7(c)
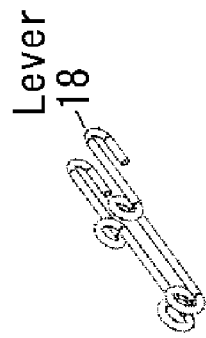
FIG. 7(d)
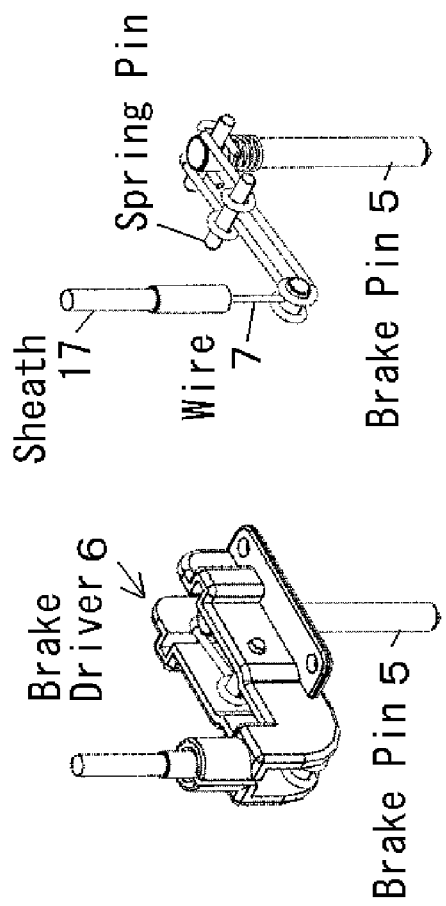
FIG. 7(e)
FIG. 7(f)

CASTER SYSTEM EQUIPPED WITH HAND-OPERATED BRAKES

TECHNICAL FIELD

The present invention relates to a caster system equipped with hand-operated brakes for bags, especially to the caster system equipped with hand-operated brakes whose wheels can be locked through a controller within reach.

BACKGROUND ART

Conventionally, various casters with hand brakes for bags have been developed. Same as the casters for the luggage carts, there are several types of casters with brakes for bags. One example is a wire-type brake in which a wire is pulled for applying brake. Another example is a rod-link type brake in which a rod is pushed or pulled for applying brake via a link. If such a hand brake for carts is simply applied to a bag caster, that hand brake becomes inconvenient to carry the bag. Therefore, there are various elaborations for embedding the hand brake inside the bag. Some examples of the conventional technology relevant to the above-mentioned caster brakes are shown below.

The lock mechanism of a caster described in the patent literature 1 is the lock capable of being operated even by a small force. As shown in FIG. 10(a), the tip and the rear end of a lever are alternately and vertically movable. A stopper can lock a wheel of a caster with the upward movement. An arm is capable of vertically sliding because the upper end side is connected to the rear end side of the lever. One end of the first connection rod is fixed to a bag body but capable of rotating. The other end is connected to the lower end of the arm. The middle part of the second connection rod is fixed to the bag body but capable of rotating. One end of the second connection rod is connected close to one end of the first connection rod. The other end of the second connection rod is connected to the stopper.

The caster for suitcases described in the patent literature 2 is the caster capable of applying brakes certainly and of being operated conveniently. As shown in FIG. 10(b), a wheel-seat with an upper through-hole is mounted fixedly on the suitcase. A bracket with a lower through-hole is abutting the wheel-seat via a shaft. Rotator and repressor are composed coaxially and abutting the bracket via an axle. The diameter of the rotator of the wheel is larger than the diameter of the repressor. There are a switching means, a following rod and a braking means. The switching means is abutting the wheel-seat via the shaft and capable of swinging between the first position and the second position. There are a contacting end and a driving end. The contacting end appears outside of the wheel-seat. The following rod is running through the upper through-hole of the wheel-seat and the lower through-hole of the bracket. The top end of the following rod is abutting the driving end of the switching means via the shaft. The braking means is connected to the bottom end of the following rod and has a stopping means.

The suitcase described in the patent literature 3 is a traveling bag having a braking system for stopping rotation of two caster wheels simultaneously. As shown in FIG. 10(c), the suitcase has a case body, two caster units, a controller, two actuators and two co-working means. The caster unit contains a hollow pipe, a caster base and a caster. The controller is connected to the case body via a shaft and capable of switching to either braking position or non-braking position. An actuating end for giving external action is made at the front end of the controller and a driving end is made at the back-end. The actuators are positioned at the top end in the case body and at the bottom end outside of the case body. There is at least one stopper at the bottom end. One end of the co-working means and the driving end of the controller are connected and the other end is connected to the top end of the actuator.

CITATION LIST

Patent Literature
Patent Literature 1: JP4180642(B1)
Patent Literature 2: JP3122929(U)
Patent Literature 3: JP3128217(U)

SUMMARY OF INVENTION

Technical Problem

However, the above-mentioned conventional casters with hand-operated brakes have following problems. Those casters need strong force for locking tires. The locking system and the form of the parts become complex and big. It takes much cost. The operation is not easy and needs strong force. The bag becomes heavy and is not convenient. The conventional casters of not hand-operation type but foot-operation type have following problems. Such caster needs to fit the toe shape of shoes. It is not easy to operate the brakes with foot. The brake operation by foot damages the shoes. In either type of caster, the caster of individual locking of tire needs at least twice locking-operations. It is because the bag can turn around the locked tire while the bag is not fixed stopped only with one locked tire.

The object of this invention is, solving the above-mentioned past problems, to make the caster for bags with hand-operated brakes small-sized, low-cost and convenient to use.

Solution to Problem

In order to solve the above-mentioned problems, the present invention is constituted as follows. The caster system equipped with a hand-operated brake comprises a wheel with a tire, a fork for supporting the wheel capable of rotating with an axle, a base fixed to the bag body for supporting the fork capable of turning with a swing shaft of hollow cylinder, a brake pin for stopping the rotation of the wheel, a brake driver for pushing the brake pin to the tread of the tire, a connection wire for transmitting the force to the brake driver apart from the wheel while enforced in the off-brake direction by a spring and a controller for locking the wheel with single operation of pulling the connection wire. The controller comprises a rotation knob, a double crank with two crank arms while fixed to the rotation knob and two links with one end connected to the double crank and the other end connected to the connection wire. The link is operated to lock the rotation knob by reversing the moment of rotation resulted from the spring when the rotation knob is turned over the predetermined angle. The brake driver transmits the braking force of the connection wire to the brake pin. The force is magnified with the lever action. The brake pin is made to push the tire.

And also, the controller comprises a handle, two cranks connected to the handle and two links with one end connected to the crank and the other end connected to the connection wire. The link is made to work to lock the handle by reversing the moment of rotation resulted from the spring when the rotation knob is turned over the predetermined angle. Or, the controller comprises a rotation knob, a crescent cam fixed to the rotation knob, a square link with one end inside thereof abutting the crescent cam and the other end connected to the connection wire. The square link is made to work to lock the rotation knob by reversing the moment of rotation resulted from the spring when the rotation knob is turned over the predetermined angle.

Advantageous Effects of Invention

As constituted above, the caster with hand-operated brakes can be made small-sized, light-weighted and low-cost. And also, it is convenient to use as the plural caster-wheels can be locked with single operation.

BRIEF DESCRIPTION OF DRAWINGS

[FIG. 2] It is the schematic representation of the brake system of the caster with hand-operated brakes of the present invention.
[FIG. 5] It is the schematic representation of the variation of the handle-type controller of the caster with hand-operated brakes of the present invention.
[FIG. 7] It is the schematic representation of the variation of the brake-driving member of the caster with hand-operated brakes of the present invention.

BEST MODE FOR CARRYING OUT THE INVENTION

Figure 1A:
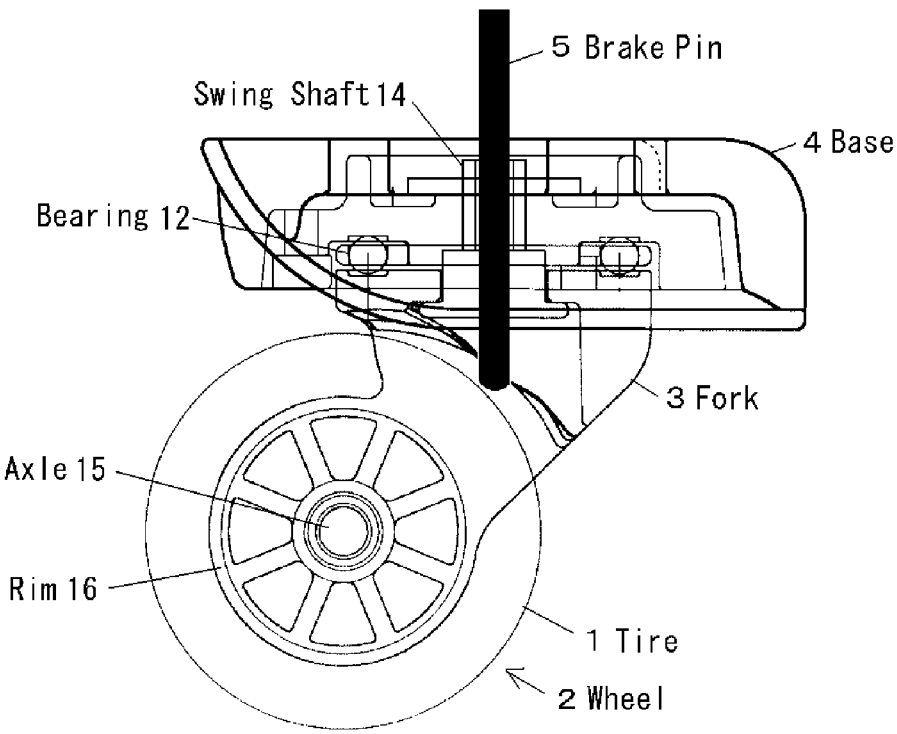
[FIG. 1] It is the schematic representation of the wheel part of the caster with hand-operated brakes of the present invention.

Hereinafter, referring to FIGS. 1 to 9, the best mode for carrying out the present invention will be explained in detail.
Description of Embodiments The embodiment of this invention is a caster with hand-operated brakes wherein the rotation knob of the controller apart from the wheels pulls the connection wire, the force is transmitted via the lever above the wheel to the brake pin that is running in the swing shaft of the fork and the brake pin is pushed to the tire for stopping the rotation of the wheel.

FIG. 1 shows the wheel structure of the caster with hand-operated brakes. FIG. 2 shows the brake system structure. FIGS. 3 to 5 show the controller structure. FIGS. 6 and 7 show the structure of the brake driver. FIG. 8 shows the operation procedure by the rotation knob. FIG. 9 shows the operation procedure by the handle. In FIGS. 1 to 9, the tire 1 is the rotating tread member made of rubber etc. The wheel 2 is a rotating member made of rim of plastics etc covered with tire. The fork 3 is a supporting member for the wheel capable of rotating with axle. The base 4 is a supporting member for the fork capable of turning while fixed to the bag body. The brake pin 5 is the member for stopping the rotation of the tire when pushed to the tread. The brake driver 6 is the brake driving mechanism for pushing the brake pin to the tire by the lever.

The connection wire 7 or simply the wire 7 is the wire for connecting the controller to the brake driver. A rod can replace the wire. The connection wire means to include the rod and so on. The controller 8 is the mechanism for pulling the connection wire. The double crank 9 is a crank with two arms on one axis. The link 10 is a member for connecting the crank to the wire. The handle 11 is a lever for operation to pull the connection wire. The bearing 12 is a bearing for supporting the swing shaft for turning. The rotation knob 13 is a mechanism for pulling the wire. The rotation knob is representative of the controllers such as a rotation knob, a handle and so on.

The swing shaft 14 is a rotation axis for turning the fork. The axle 15 is a shaft for rotating the wheel. The rim 16 is the member for connecting the tire and the axle. The sheath 17 is the supporting cover of the wire. A set of sheath and wire may be sometimes called only a wire. The lever 18 is the member for pushing the brake pin pulled by the wire. The screw 19 is a means for regulating the pushing pressure of the brake pin by regulating the mutual position between the wire and the sheath. The bag body 20 is the holding part for loads of the bag. The square link 21 is the square frame-like member for pulling the wire. The crescent cam 22 is a crescent-like cam for moving the square link according to the rotation of the rotation knob.

Figures 1B, 1C:
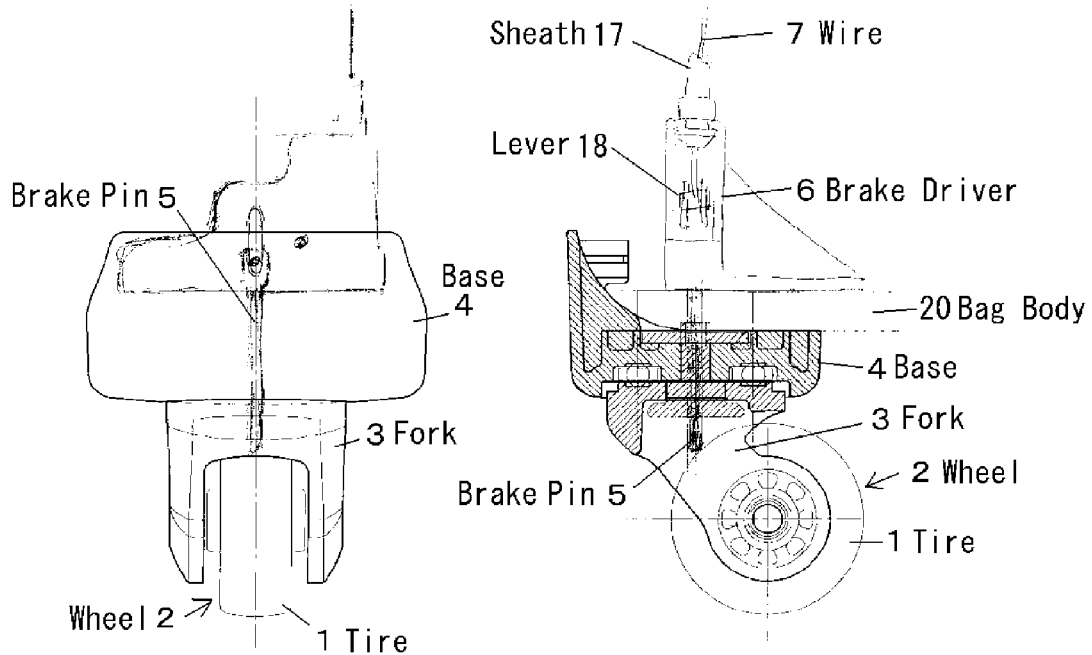
Figure 3A:
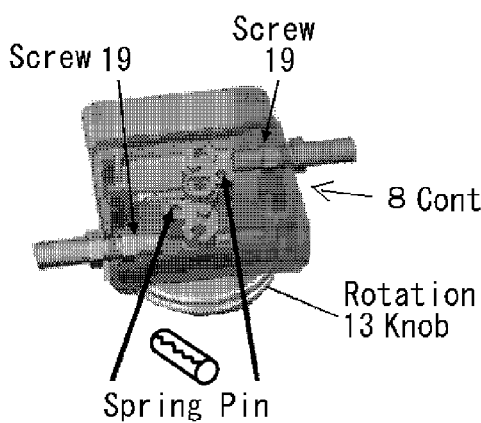
[FIG. 3] It is the schematic representation of the controller of the caster with hand-operated brakes of the present invention.
Figure 3B:
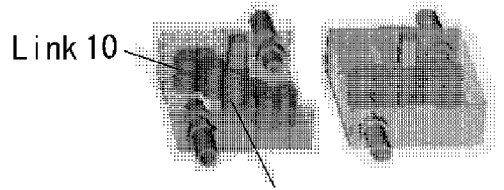
Figure 3C:
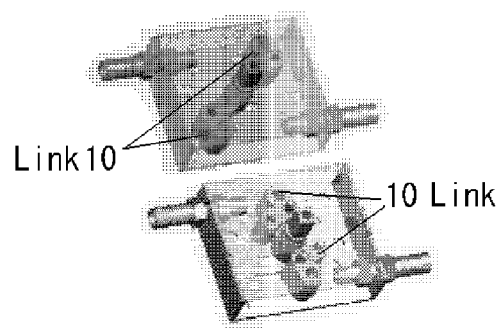
Figure 3D:
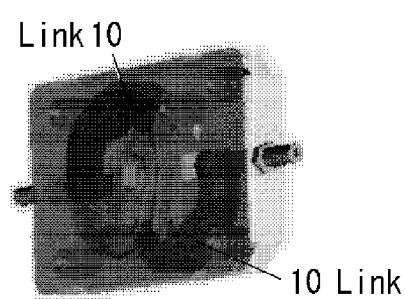
Figure 3E:
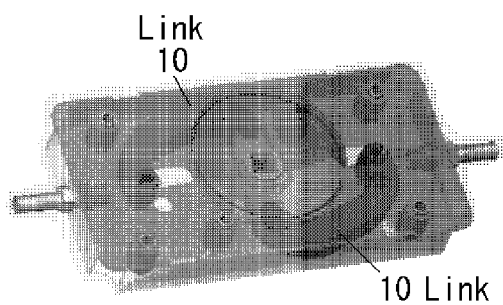
Figure 3F:
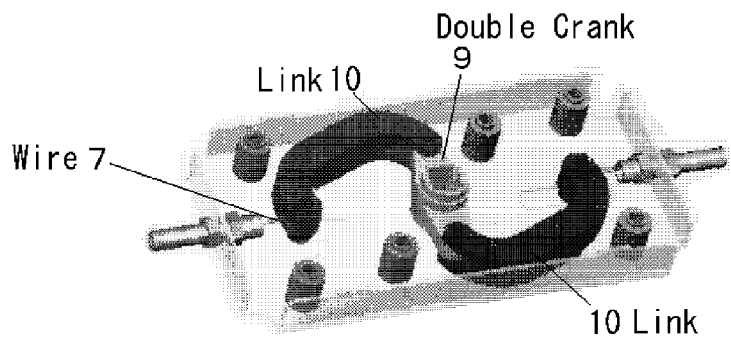
Figure 4A:
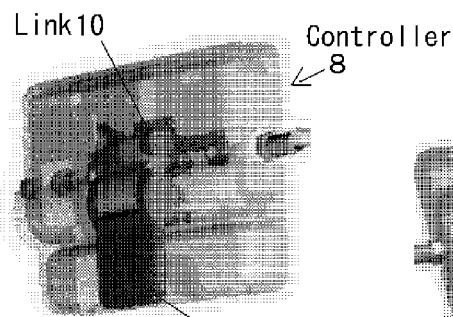
[FIG. 4] It is the schematic representation of the handle-type controller of the caster with hand-operated brakes of the present invention.
Figure 4B:
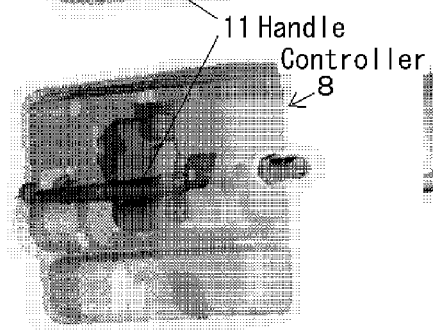
Figure 4C:
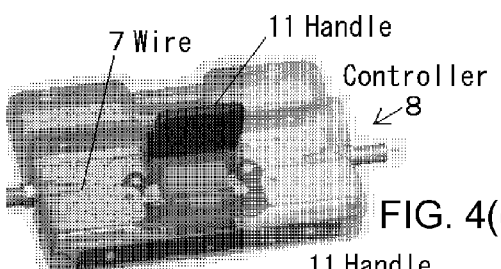
Figure 4D:
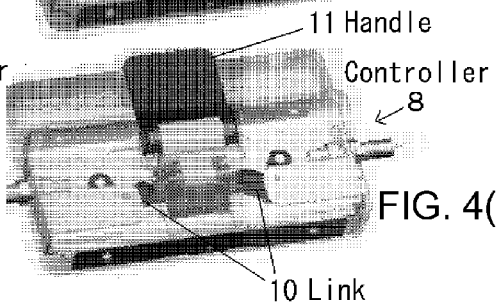
Figure 4E:
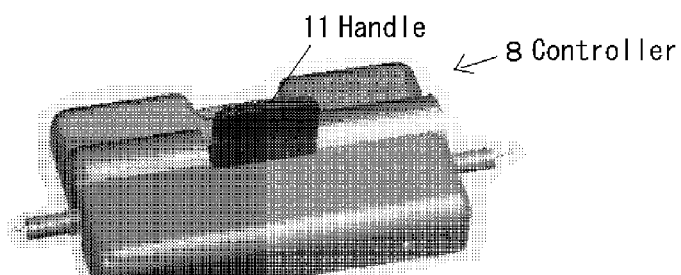
Figure 4F:
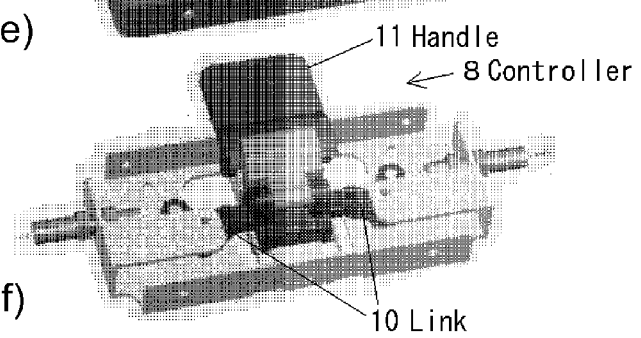
Figure 6A:
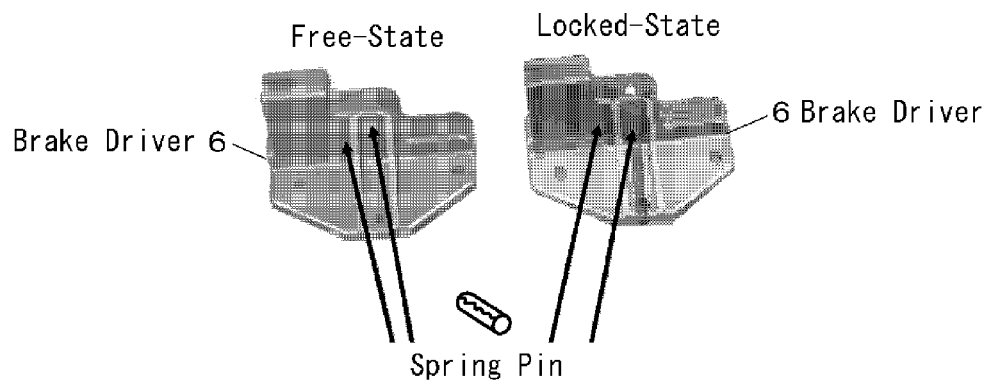
[FIG. 6] It is the schematic representation of the brake-driving member of the caster with hand-operated brakes of the present invention.
Figure 6B:
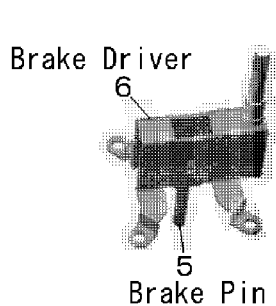
Figure 6C:
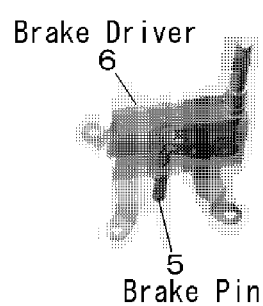
Figure 6D:
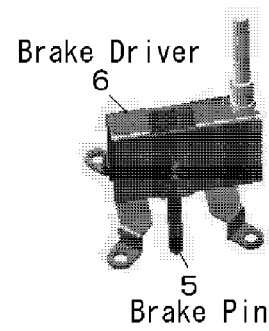
Figure 6E:
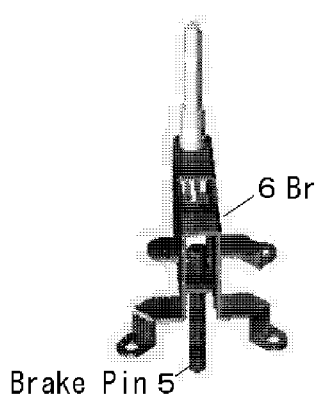
Figure 6F:
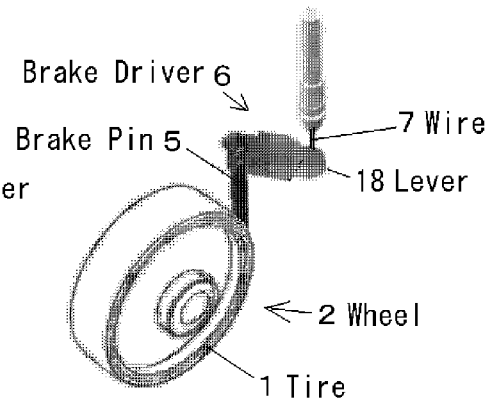
Figure 8A:
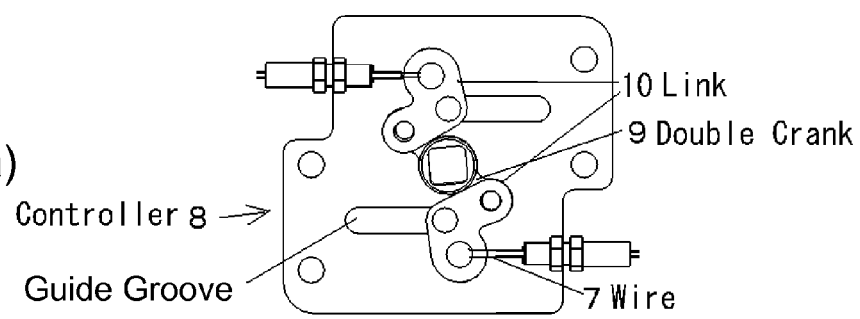
[FIG. 8] It is the diagram of the operation procedure by the rotation knob of the caster with hand-operated brakes of the present invention.
Figure 8B:
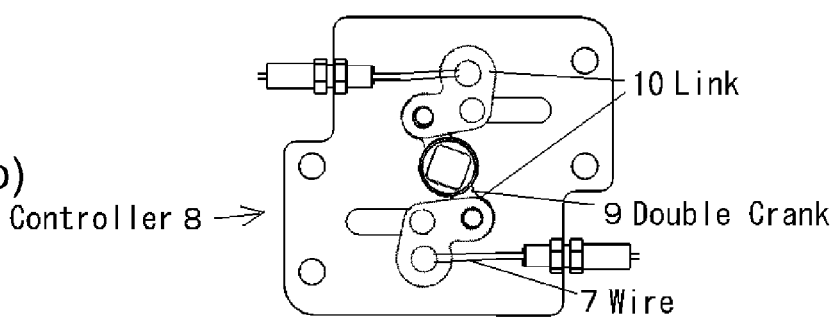
Figure 8C:
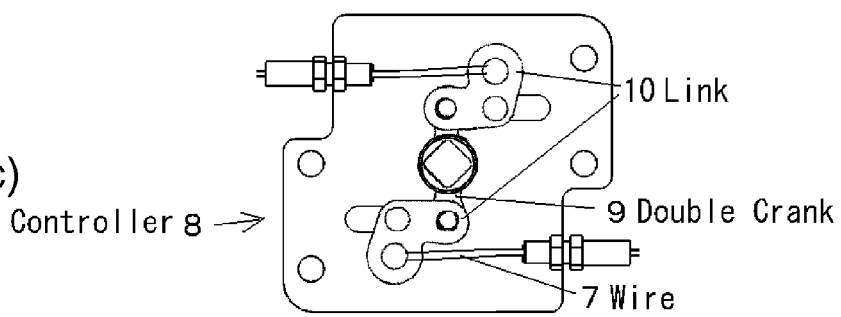
Figure 8D:
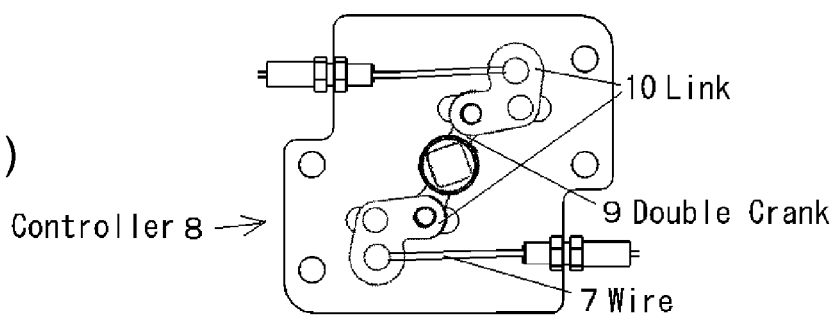
Figure 8E:
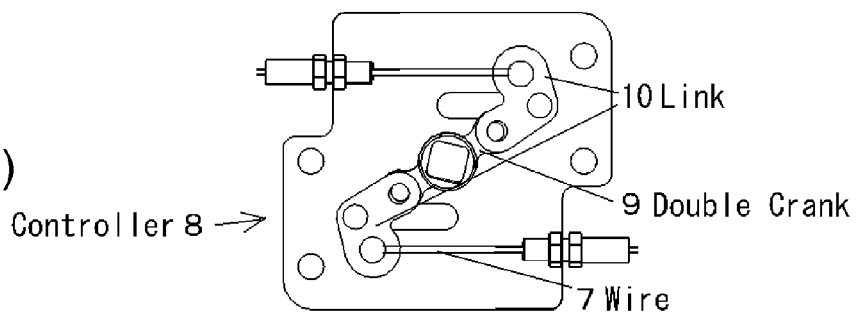
Figure 9A:
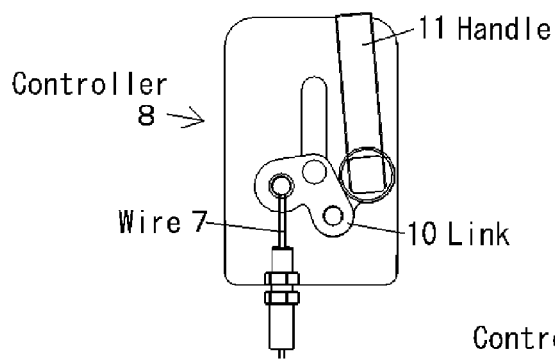
[FIG. 9] It is the diagram of the operation procedure by the handle of the caster with hand-operated brakes of the present invention.
Figure 9B:
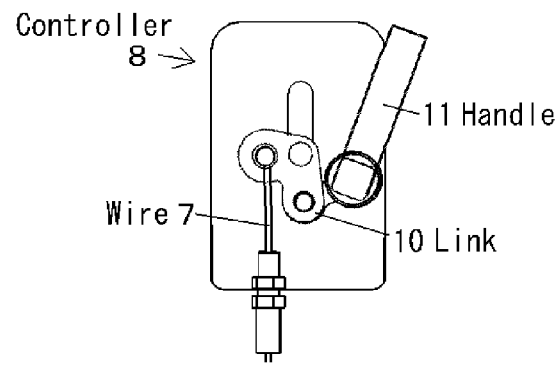
Figure 9C:
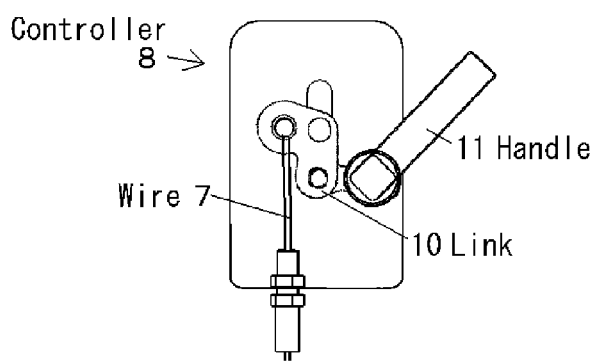
Figure 9D:
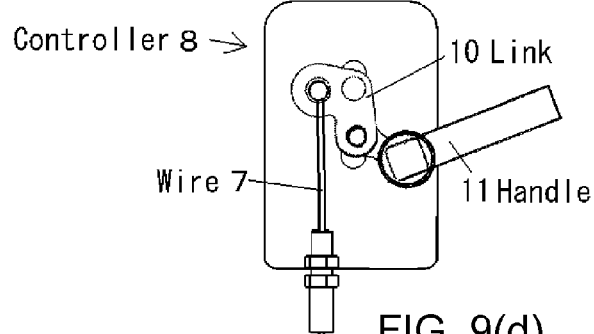
Figure 9E:
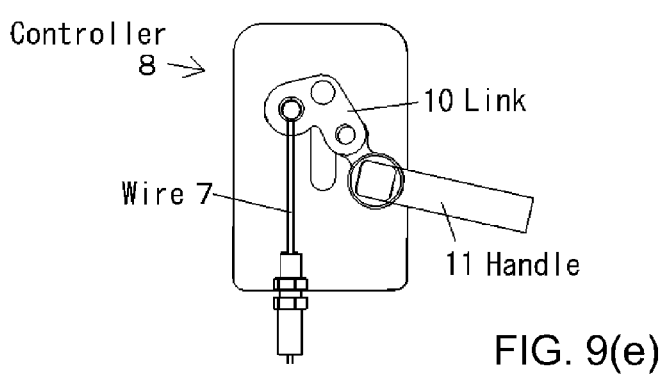
Figure 10A:
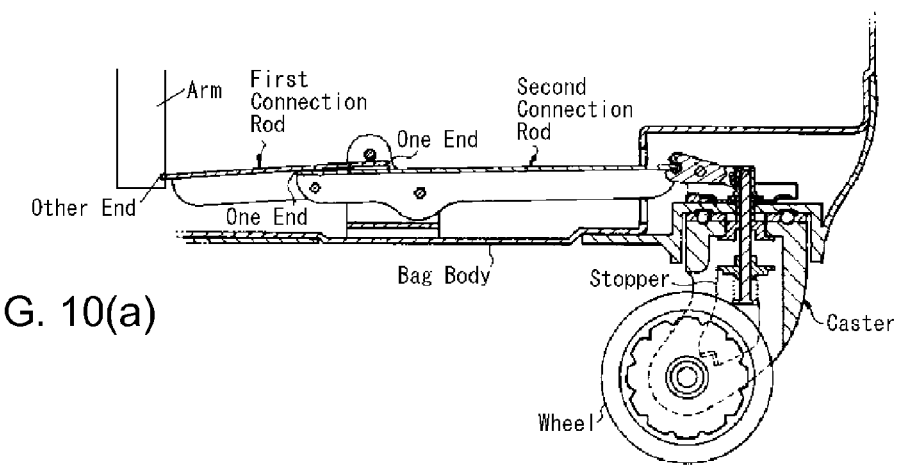
[FIG. 10] It is the schematic representation of the conventional casters with hand-operated brakes of the present invention.
Figure 10B:
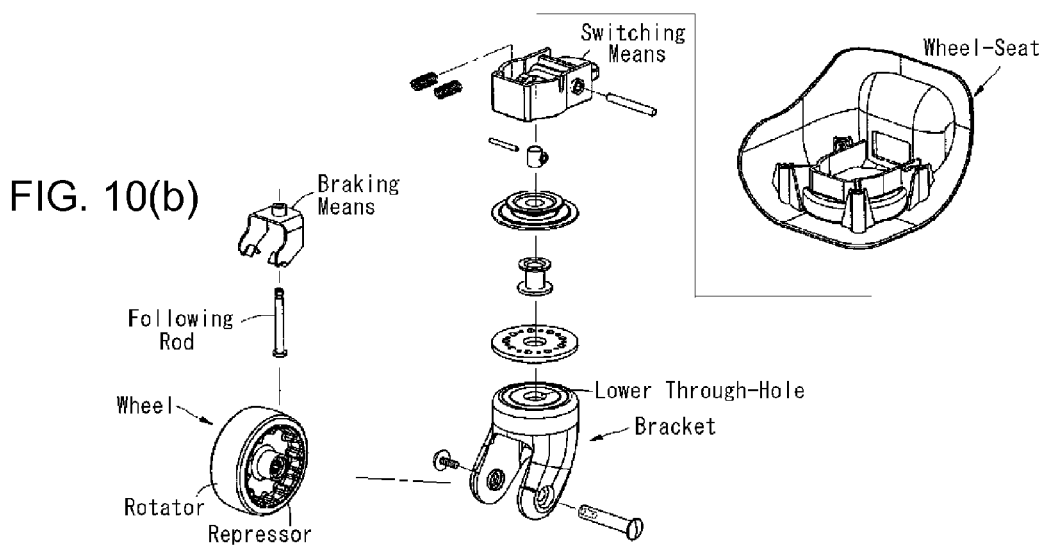
Figure 10C:
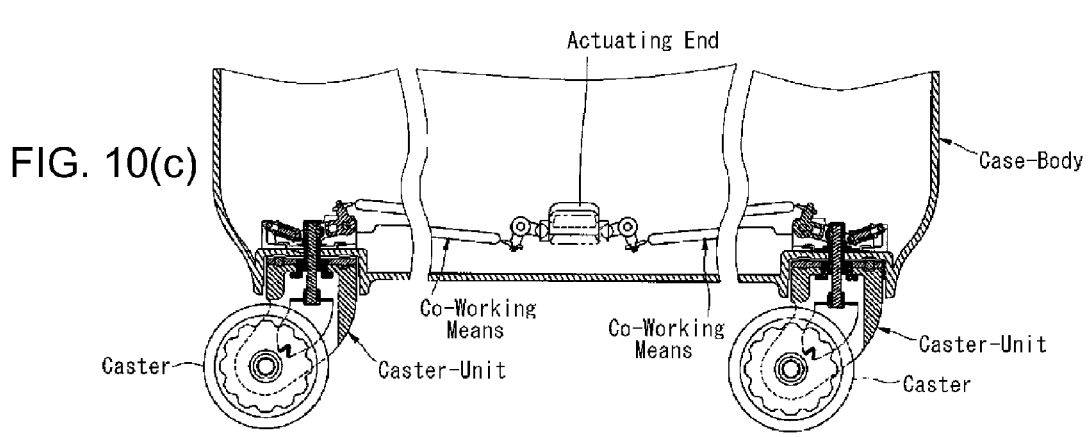

The function and the operation of the caster with hand-operated brakes of the present invention as constituted above are explained. First, referring to FIG. 1, the outline of the function of the caster with hand-operated brakes is explained. FIG. 1(a) shows the side-view of the caster wheel. FIG. 1(b) shows the elevation-view of the caster wheel. FIG. 1(c) shows the side-view of the caster wheel and the brake driver. As shown in FIG. 1(a), the wheel 2 made of tire 1 and the rim 16 is capable of rotating supported with the fork 3 via the axle 15. The fork 3 is capable of turning supported with the base 4. The hollow swing shaft 14 is mounted to the bearing of the base 4 for turning.

Although not shown in FIG. 1, there is a controller apart from the wheel 2. The connection wire 7 is pulled when the rotation knob of the controller is turned. As shown in FIG. 1(c), the connection wire 7 pulls the lever 18 of the brake driver 6. The pulling force of the connection wire 7 is magnified by the action of the lever 18. The brake pin 5 running through the swing shaft 14 of the fork 3 is pushed to the tire 1 of the wheel 2. When the brake pin 5 is pushed to the tire 1, the friction force inhibits the rotation of the wheel 2. Instead of the connection wire 7, a combination of a link and a rod can be used to transmit the brake force. Instead of the rotation knob of the controller, a handle can be used for pulling the wire or pushing the link.

Two or four wheels are furnished to a suitcase or a carrying case ordinarily. These plural wheels can be locked with a single operation by the controller near at hand. Though the brake driver 6 is located just above the wheel 2, the wheel 2 can be easily locked by remote operation with the controller located apart from the wheel. Because the controller and the brake driver 6 are connected with the space-saving connection wire 7, it scarcely restrain the design or containing capacity of the bag though this brake system is furnished inside or outside of the suitcase or carrying case. The controller can be located at arbitrary position only by changing the length or the curvature of the connection wire 7. And also, because the controller is constituted with a rotation knob familiar in daily life and a combination of a double crank and a link, the caster becomes small and light and easy to operate. The strong brake can be applied to the caster with an enough stroke.

Next, referring to FIG. 2, the relation between the controller and the brake driver is explained. FIGS. 2(*a*), (*c*), (*d*), (*e*) show the free state of the brake. FIGS. 2(*b*), (*f*), (*g*), (*h*) show the locked state of the brake. When the rotation knob 13 of the controller 8 is turned, the connection wire 7 is pulled and the lever 18 of the brake driver 6 is pulled. The lever 18 pushes the brake pin 5. The tension force of the connection wire 7 is changed to the force to push the brake pin 5 via the lever 18 of the brake driver 6. The lever 18 of the brake driver 6 pushes the brake pin 5 to the tread of the tire to lock the rotation of the tire. The pushing force is adjustable with the regulation screw 19 of the connection wire 7.

The structure of the brake driver 6 is very simple. But it can yield the very strong pushing force. Though the shape of the brake pin 5 for pushing the tire is very simple, it locks the wheel very strongly. In this embodiment, only two wheels are locked. By branching the connection wire 7, any plural wheels can be locked at one time. The connection wire 7 can be freely deformed. According to the size or form or material of the bag, it is flexibly adaptable. It is very easy to attach the brake system to a bag.

Next, referring to FIG. 3, the action of the controller is explained. Turning the rotation knob 13 of the controller 8, the connection wire 7 is pulled. When the controller 8 is constituted symmetrically, two connection wires 7 can be pulled simultaneously. FIGS. 3(*a*) to (*c*) show the controller using the L-shaped link 10 guided by a groove. FIGS. 3(*d*) to (*f*) show the controller using C-shaped link 10 without guide groove. Either one of them is locked by the reverse moment of rotation caused when the rotation knob 13 is turned over predetermined angle. Instead of pulling the connection wire 7, two rods can be pushed for braking.

When the rotation knob 13 is turned, the double crank 9 connected to the axis of the knob rotates. One arm of the L-shaped link 10 is connected to the double crank 9. The connection wire 7 is connected to the other arm of the L-shaped link 10. The corner part of the link 10 moves as guided by the guide groove. The connection wire 7 is enforced with a spring to the free side of the brake. The double crank 9 is rotated when the rotation knob 13 is turned to the lock side of brake, and the link 10 moves as pulled by the double crank 9. When the rotation knob 13 is turned partway, the double crank 9 and the link 10 are reaching near the straight state. When the rotation knob 13 is turned more, the angle between the double crank 9 and one arm of the link 10 surpasses the predetermined angle. Then the force of the spring to pull the connection wire 7 becomes to act to turn the double crank 9 to the reverse direction. Consequently, the double crank 9 and the link 10 fall to the steady lock state. The rotation knob 13 never stops partway and then the wheel never becomes accidentally to rotate at half-braking.

Next, referring to FIG. 4, the handle-type controller is explained. Instead of the rotation knob, the handle 11 pulls the connection wire 7. The rotation axis of the handle 11 is different to the rotation axis of the rotation knob by 90 degrees in angle. It is only one difference. The function and the workings of the other parts of the handle 11 are almost the same. When the handle 11 is raised, the crank connected to the handle 11 pulls the link 10. The connection wire 7 connected to the link 10 is pulled. When the handle 11 is raised over the predetermined angle, the spring force to pull the connection wire 7 acts to tilt the handle 11 to the locking side of brake. Then the handle 11 is held at the steady braking position.

Next, referring to FIG. 5, the variation of the handle-type controller is explained. Two connection wires 7 are led out of one side of the controller 8. When the controller with two connection wires led out right and left is tried to attach to the ordinary bag, some limitations for attaching would arise because the connection wire 7 might interfere with two pipes of the carrying handle. Then, the interference is avoided by using the simple-type controller whose connection wires are led out in the same direction. The controllers as shown in FIGS. 5(*a*) to (*d*) are basically the same as that shown in FIG. 4 except the direction of the connection wire 7. In the controllers as shown in FIGS. 5(*e*) to (*f*), the crescent cam 22 raises the square link 21 of square frame to which the connection wire 7 is attached. The crescent cam 22 is connected directly to the axis of the rotation knob. When the crescent cam 22 is turned further after the square link 21 is raised at the highest position, the crescent cam 22 receives the moment of rotation in the opposite direction. Therefore, the crescent cam 22 receives the force in the left direction and it stops at the left inside of the square link 21 and is held steadily.

Next, referring to FIG. 6, the work and the function of the drive is explained. FIG. 6(*a*) shows the appearance of an example of the brake driver 6. FIGS. 6(*b*) to (*e*) show the appearances of other examples of the brake driver 6. The lever 18 is assembled movably with a spring pin to the framework of the brake driver 6. The brake pin 5 and the connection wire 7 are assembled movably to the lever 18 with a spring pin. The brake pin 5 is running through the hollow-cylinder swing shaft. The head of the brake pin 5 is held capable of turning with a spring pin at the point of application of the linear lever 18. The fulcrum (pivot) of the lever 18 is held movably with a spring pin at the bag body via the frame of the drive 6. The force-application point of the lever 18 is connected to the connection wire 7. The sheath of the connection wire 7 is fixed to the frame of the brake driver 6. The brake pin 5 is set off from the tire 1 at the free state because the connection wire 7 is forced by the spring in the free-direction of the brake.

When the rotation knob 13 of the controller 8 is operated for the connection wire 7 to be pulled in the braking direction, the connection wire 7 pulls the lever 18, the application point of the lever 18 pushes the brake pin 5 and the brake pin 5 is pushed to the tire 1. The brake pin 5 pushes the tread of the tire 1 obliquely to stop the rotation of the wheel 2. Though the force to pull the connection wire 7 is small, the brake pin 5 pushes the tire strongly because the stroke of the connection wire 7 is long and the lever 18 magnifies the force. Though the stroke of the brake pin 5 is short, the free position can be reserved enough away from the tire 1 and the brake pin 5 can push the tire 1 with enough strong force at the braking position. The axis of the brake pin 5 is the same as the axis of the swing shaft. Therefore, the brake pin 5 can always hold the same position to the wheel 2 even if the wheel 2 is turned. When the controller 8 is changed to locking state, the brake pin 5 is held in such state as pushed strongly to the tire 1 and then the wheel 2 cannot rotate.

The reason why the turning of the fork 3 is inhibited by the brake pin 5 is explained. As shown in FIG. 6(*f*), when the brake is applied, the brake pin 5 touches the tread of the tire 1 at the 45-degree point on the right-upper part. The brake pin 5 has a tapered head end with inclination of about 45-degree. The tapered end of the brake pin 5 touches close to the tread of the tire 1. The brake pin 5 itself never turns. It inhibits the fork 3 to turn. If the tapered end of the brake pin 5 has stripes on the surface, it is more effective to inhibit turning. And also, when the brake pin 5 pushes the tread of the tire 1, it causes the swing shaft 14 of the fork 3 tilted. Therefore, the friction between the swing shaft 14 of the fork 3 and the bearing 12 becomes large and the fork 3 is inhibited to turn. Thus, the brake pin 5 inhibits strongly the turning of the fork 3. The fork 3 would not turn at ordinary sway in a train car.

Next, referring to FIG. 7, variations of the brake driver are explained. If the brake pin 5 is directly pushed against the tire by a very rigid mechanism, the force of brake operation is directly reflected in effectiveness of the brake. Then, delicate brake operation is needed. Few degrees of rotation angle of the operation lever influences effectiveness of the brake greatly. Rotation operation of the operation lever requires very delicate feeling. The adjustable screw of the connection wire can adjust effectiveness of the brake. Very delicate adjustment work is required. Then, shock-absorbing material is put in the middle of the drive course that carries out remote control operation of the brake. Specifically, there are various methods, for example, using a link as an elastic component, making the connection wire an elastic wire, using the lever of a brake actuator as a wire spring etc. Here, how to use a lever 18 as a wire spring is explained.

The first variation sample is the lever 18 composed of single spring. FIG. 7(a) shows the appearance of the brake driver 6 of the first variation. FIG. 7(b) shows the interior of the brake driver 6. FIG. 7(c) shows the lever 18 composed of one spring. The second variation sample is the lever 18 composed of two springs. FIG. 7(d) shows the appearance of the brake driver 6 of the second variation. FIG. 7(e) shows the inside view of the brake driver 6. FIG. 7(f) shows the lever 18 composed of two springs. There are no differences in function between two variations. It is easier to assemble the single-unit lever 18 of single spring than to assemble the divided-unit lever 18 of two springs. Then, the assemble miss hardly happens. But, the cost of the single-unit lever 18 of single spring is higher than the divided-unit lever 18 of two springs if the accuracy of spring is the same. At the same cost, the accuracy of spring of the divided-unit lever 18 is better than the single-unit lever 18.

When the connection wire 7 is pulled with the controller, the brake pin 5 is pushed to the tire via the lever 18. At that time, as the lever 18 has spring feature, the lever 18 works as a buffer for the brake pin 5. That is, if the connection wire is pulled strongly, the bending lever 18 absorbs the strong force. The brake pin 5 never pushes the tire strongly. The reaction force of the brake pin 5 does not conduct to the controller directly. Then the feeling of brake operation becomes soft. And also, the brake pin 5 becomes to be pushed against the tire always by the fixed force within the limits owing to the spring effect of the lever 18 if there are some differences between the movement of the brake pin 5 and the movement of the controller caused by the parts-size errors in the remote control braking system or assembly errors. That is, the lever 18 of linear spring absorbs the dispersion. The effectiveness of brake and the rotation feeling of the operation lever are falling in the fixed range. Adjustment by the adjustable screw of the connection wire 7 also becomes easy.

Next, referring to FIG. 8, the operation procedure of the controller is explained. As shown in FIG. 8(a), the connection wire 7 is enforced by the spring and it is at the off-brake position. When the rotation knob is turned, as shown in FIG. 8(b), the double crank 9 is turned, it pulls one end of the link 10. As shown in FIG. 8(c), the link 10 moves guided by the guide groove, it pulls the connection wire 7. When the rotation knob is turned more, as shown in FIG. 8(d), the double crank 9 and the link 10 become almost in-line. When the rotation knob is turned more, as shown in FIG. 8(e), the moment of rotation caused by the link 10 to pull the double crank 9 reverses. The double crank 9 receives the reverse force of rotation. At this position, the rotation of the double crank 9 stops at the limit of rotation angle. That is, the brake is locked at that state. In order to release the brake, if the rotation knob is turned in the free direction, the lock state is released. The rotation knob is turned in the free direction and the brake is released and stops steadily at the free state position.

Next, referring to FIG. 9, the operation procedure by the operation lever is explained. As shown in FIG. 9, when the handle 11 is at the down position, the connection wire 7 is pulled by the spring to be at the free state position. As shown in FIG. 9(b), when the handle 11 is raised a little, the connection wire 7 is pulled a little to push the brake pin a little. From the state as shown in FIG. 9(c), when the handle 11 is raised more, as shown in FIG. 9(d), the connection wire 7 comes to the maximum moving position. When the handle 11 is raised more, as shown in FIG. 9(e), the handle 11 becomes to receive the reverse force from the connection wire 7 and it stops held steadily.

As described above, in the embodiment of the present invention, a caster with hand-operated brakes is constituted as follows. The rotation knob of the controller apart from the wheels pulls the connection wire. The force is transmitted to the brake pin running in the swing shaft of the fork via the lever above the wheel. The brake pin is pushed to the tire for stopping the rotation of the wheel. Therefore, the caster with hand-operated brakes can be made small-sized, light-weighted and low-cost. And also, it is convenient to use as the plural caster-wheels can be locked with single operation.

Industrial Applicability

The caster system equipped with hand-operated brakes of this invention is most suitable for bags. It is also suitable for other kind of carriages.

Reference Signs List

1: Tire
2: Wheel
3: Fork
4: Base
5: Brake pin
6: Brake driver
7: Connection wire
8: Controller
9: Double crank
10: Link
11: Handle
12: Bearing
13: Rotation knob
14: Swing shaft
15: Axle
16: Rim
17: Sheath
18: Lever
19: Screw
20: Bag body
21: Square link
22: Crescent cam

The invention claimed is:

1. A caster system equipped with hand-operated brakes comprised of a wheel with a tire, a fork for supporting the wheel capable of rotating with an axle, a base fixed to a body of a bag supported by said caster system, said base for supporting the fork capable of turning with a swing shaft of about a hollow cylinder swing shaft, a brake pin for stopping rotation of the wheel, a brake driver for pushing the brake pin to a tread of the tire, a connection wire for transmitting force to the brake driver which is maintained in an off-brake position by a spring lever, and a controller for locking the wheel with the single operation of pulling the connection wire, wherein said controller comprises a rotation knob, a double crank with two crank arms fixed to the rotation knob and two links with one end of said links connected to the double crank and the other end of said links connected to the connection wire, said two links are rotationally mounted to rotate in a direction opposite the rotation direction of the rotation knob, said two links lock the rotation knob by reversing rotation when the rotation knob is turned beyond a predetermined angle, said brake pin is made to push the tire, and said brake driver transmits the braking force of the connection wire to the brake pin magnified by the spring lever.

2. A caster system equipped with hand-operated brakes comprised of a wheel with a tire, a fork for supporting the wheel capable of rotating with an axle, a base fixed to a body of a bag supported by said caster system, said base for supporting the fork capable of turning a hollow cylinder swing shaft, a brake pin for stopping rotation of the wheel, a brake driver for pushing the brake pin to a tread of the tire, a connection wire for transmitting force to the brake driver which is maintained in an off-brake position by a spring lever, and a controller for locking the wheel with the single operation of pulling the connection wire, wherein said controller comprises a handle, two cranks connected to the handle and two links with one end connected to the two cranks and the other end connected to the connection wire, said two links are rotationally mounted to rotate in a direction opposite the rotation direction of the handle, said two links lock the handle by reversing rotation of the links when the handle is turned beyond a predetermined angle.

3. A caster system equipped with hand-operated brakes according to claim 1, wherein said brake driver transmits the braking force of the connection wire to the brake pin magnified with lever action provided by a spring lever comprised of one part.

4. A caster system equipped with hand-operated brakes according to claim 2, wherein said brake driver transmits the braking force of the connection wire to the brake pin magnified with lever action provided by a spring lever comprised of one part.

5. A caster system equipped with hand-operated brakes according to claim 1, wherein said brake driver transmits the braking force of the connection wire to the brake pin magnified with lever action provided by a spring lever comprised of two parts.

6. A caster system equipped with hand-operated brakes according to claim 2, wherein said brake driver transmits the braking force of the connection wire to the brake pin magnified with lever action provided by a spring lever comprised of two parts.

* * * * *